United States Patent [19]

Finnah

[11] Patent Number: 5,017,125

[45] Date of Patent: May 21, 1991

[54] APPARATUS FOR FEEDING A LABEL TO A CAVITY OF A MOLDING DEVICE FOR THERMOFORMING PLASTIC CONTAINERS

[75] Inventor: Josef Finnah, Ahaus, Fed. Rep. of Germany

[73] Assignee: GEA Finnah GmbH, Ahaus, Fed. Rep. of Germany

[21] Appl. No.: 494,069

[22] Filed: Mar. 15, 1990

[30] Foreign Application Priority Data

Mar. 17, 1989 [DE] Fed. Rep. of Germany ....... 3908774

[51] Int. Cl.$^5$ ............................................. B29C 49/24
[52] U.S. Cl. ..................... 425/504; 425/510; 425/519; 425/126.1; 425/538; 425/540
[58] Field of Search ...................... 425/126.1, 504, 510, 425/522, 539, 527, 538, 540

[56] References Cited

U.S. PATENT DOCUMENTS

| | | | |
|---|---|---|---|
| 4,355,967 | 10/1982 | Hellmer | 264/509 |
| 4,359,314 | 11/1982 | Hellmer | 264/509 |
| 4,549,863 | 10/1985 | Bourgeois | 264/509 |
| 4,680,000 | 7/1987 | Nowicki et al. | 925/126.1 |
| 4,861,541 | 8/1989 | Kaminski et al. | 264/509 |

Primary Examiner—Willard E. Hoag
Attorney, Agent, or Firm—Jordan and Hamburg

[57] ABSTRACT

An apparatus for feeding a label into a mold cavity of a bottom tool which can move up and down in a apparatus for thermoforming plastic containers from a film includes a feeder for the intermittent advancement of a strip of labels by a predetermined amount, a cutting means for cutting off a single label each time from the leading edge of the label strip, and transport means for transferring the single label to a final position in the mold cavity in which it lies against a side wall of the mold cavity and is held in place. The transport means is a transfer arm which grips the label strip and before the label is out off and, after it is cut off, carries it over the top edge of the mold cavity of the bottom tool while the latter is in its bottom, starting position, and lays it against one side wall of the mold cavity.

20 Claims, 3 Drawing Sheets

APPARATUS FOR FEEDING A LABEL TO A CAVITY OF A MOLDING DEVICE FOR THERMOFORMING PLASTIC CONTAINERS

BACKGROUND OF THE INVENTION

The invention relates to an apparatus for feeding a label into a mold cavity of a bottom tool which can be moved up and down in a molding device for thermoforming plastic containers from a plastic film.

In a known apparatus of this kind, a tangential slot is provided within reach of the mold cavity for the introduction of the label previously cut to length from the label strip, and the transport means include a rotatable winding mandrel disposed in alignment with the mold cavity, which during the molding process forms with its end face the bottom of the mold cavity, and toward which the molding device is displaceable in the longitudinal axis of the mold cavity until the winding surface of the winding mandrel lies completely within the mold cavity. The individual label is first wound onto the winding mandrel and, after its introduction into the mold cavity, is unwound from the winding mandrel by rotating the latter in the opposite direction, so as to apply itself to the lateral wall of the mold cavity. When the plastic film is shaped by the thermoforming process with the input of heat, the label is then sealed or adhered to the outer wall of the thermoformed plastic container.

In this known configuration of a label feeding apparatus the molding device is complicated in its construction and troublesome due to the providing of the tangential label introduction slot on the mold cavities. This is contributed to also by the multiple successive movements including the rotatory movement of the winding mandrel in opposite directions to the label insertion, which also greatly retard the process of putting the label into the mold cavity, and also inaccuracies are introduced in the placement of the label on the lateral wall of the mold cavity in the label insertion process.

SUMMARY OF THE INVENTION

It is the object of the invention to create an apparatus for the feeding of labels to a molding apparatus for the thermoforming of plastic containers, of the kind described above, which will be simple in construction and permit a rapid and precise placement of the label in the corresponding mold cavity.

This object is achieved in accordance with the invention by configuring the apparatus in accordance with claim 1. In this configuration the transfer arm provided as the transport means grasps the label that is to be placed in the mold cavity before it is separated from the label strip, which permits an especially precise pickup and alignment of the label on the transfer arm. Immediately after the individual label has been cut from the leading end of the label strip it is brought into contact with the intended container wall by the transfer arm itself directly, without the intervention of any other transport means, in a continuous movement over the upper marginal edge of the corresponding mold cavity, so as to be sealed or adhered to the outside wall of the thermoformed container in the thermoforming of the plastic film that follows. The transfer arm performs only a simple, uncomplicated movement between a position for receiving the label that is to be severed, and a position for the delivery of the severed label to the mold cavity, as it can be done in an amazingly simple manner by constructing the transfer arm as a rocking device which can swing about a horizontal axis parallel to the edge of the mold cavity. In this manner the label can be inserted quickly and precisely into the corresponding mold cavity, which due to the configuration of the label transport means in accordance with the invention requires no additional measures such as a label insertion slot, so that the molding apparatus itself is kept free of complications due to label insertion, and thus has a high degree of immunity to trouble and ease of maintenance on account of easier accessibility to the individual parts.

Additional features and advantages of the invention will be found in the subordinate claims and in the following description, in conjunction with the drawing wherein an embodiment of the subject matter of the invention is represented diagrammatically.

DESCRIPTION OF THE PREFERRED EMBODIMENTS

Figure 1:
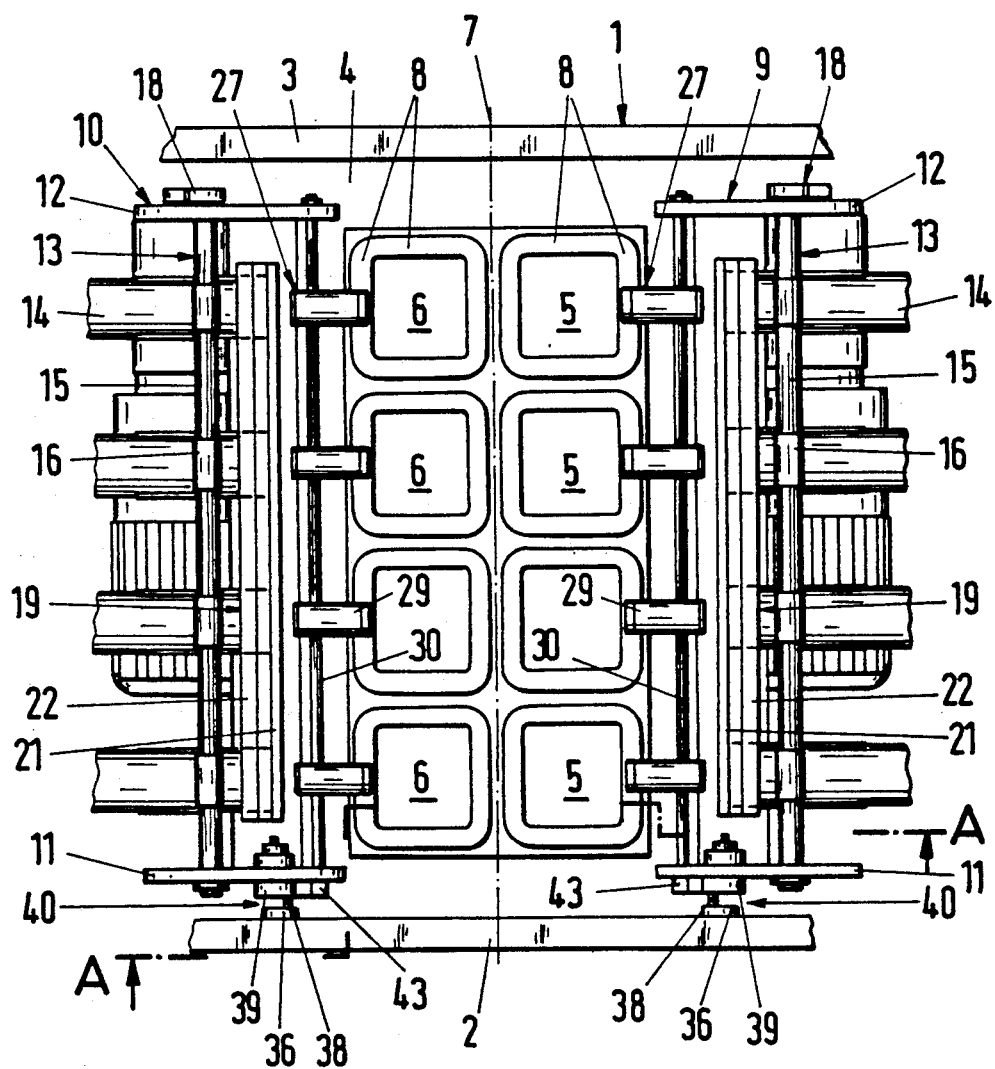
FIG. 1 of the drawing is a top view of the bottom tool of a molding apparatus for the thermoforming of plastic containers from plastic film, with a two-row arrangement of mold cavities and with transfer means on both sides for feeding labels to the adjacent row of mold cavities.

FIG. 1 of the drawing shows a molding apparatus for the thermoforming of plastic containers of a rectangular or square cross-sectional plan in the example shown, made of plastic film, showing the bottom tool 1 which can move up and down. The bottom tool 1 includes a front cross-beam 2 and a rear crossbeam 3 as well as a horizontal mold bed 4 extending between them, in which two parallel rows of mold cavities 5 and 6 are formed in symmetrical arrangement on either side of the vertical longitudinal central plane 7 of the bottom tool 1. The mold cavities 5 and 6 are each defined by four lateral walls 8 adjoining one another at right angles.

According to the example shown, of a two-row arrangement of mold cavities on either side of the vertical longitudinal central plane 7 of the bottom tool 1, two devices for feeding one label each into the mold cavities 5 and 6 are provided, which in turn are carried each by a carriage 9 and 10, respectively, in symmetrical arrangement on either side of the vertical longitudinal central plane 7. The carriages 9 and 10 are of identical configuration and are represented in FIG. 1 each with one end plate 11 adjacent the crossbeam 2 of the bottom tool 1 and another end plate 12 adjacent the crossbeam 3 of the bottom tool 1. The carriages 9 and 10 are movable transversely of the longitudinal central plane 7 of the bottom tool 1 and thus transversely of the direction of feed of the thermoformable plastic film, and are held with respect to the mold cavities, with their label feeders in a working position in relation to the adjoining row of mold cavities 5 and 6, respectively, this position being adjusted according to the dimensions of the labels being fed, in coordination with the dimensions of the mold cavities 5 and 6.

In the end plates 11 and 12 of each carriage 9 and 10, is a feeder 13 for the intermittent bringing of a label strip 14 bearing a series of labels in front of each mold cavity 5 and 6 of the two rows of mold cavities, a feed shaft 15 is rotatably supported, on which four pressure rolls 16 are affixed for a gripping engagement with each label strip 14. The pressure rolls 16 cooperate with a shaft 17 (FIGS. 2 and 3) journaled in the end plates 11 and 12, as a counter-pressure means. The draw shaft 15 is intermittently driven, in a manner not shown, by a chain drive 18 or other such drive means engaging the shaft on the outer side of the end plate 12 of the carriage 9, 10, in order to advance the label strips 14, toward a cutting device 19 by an amount each time corresponding to the length of a single label, by the pinching action in the nip between the driven pressure rolls 16 and the idling counter-pressure shaft 17.

Figure 2:
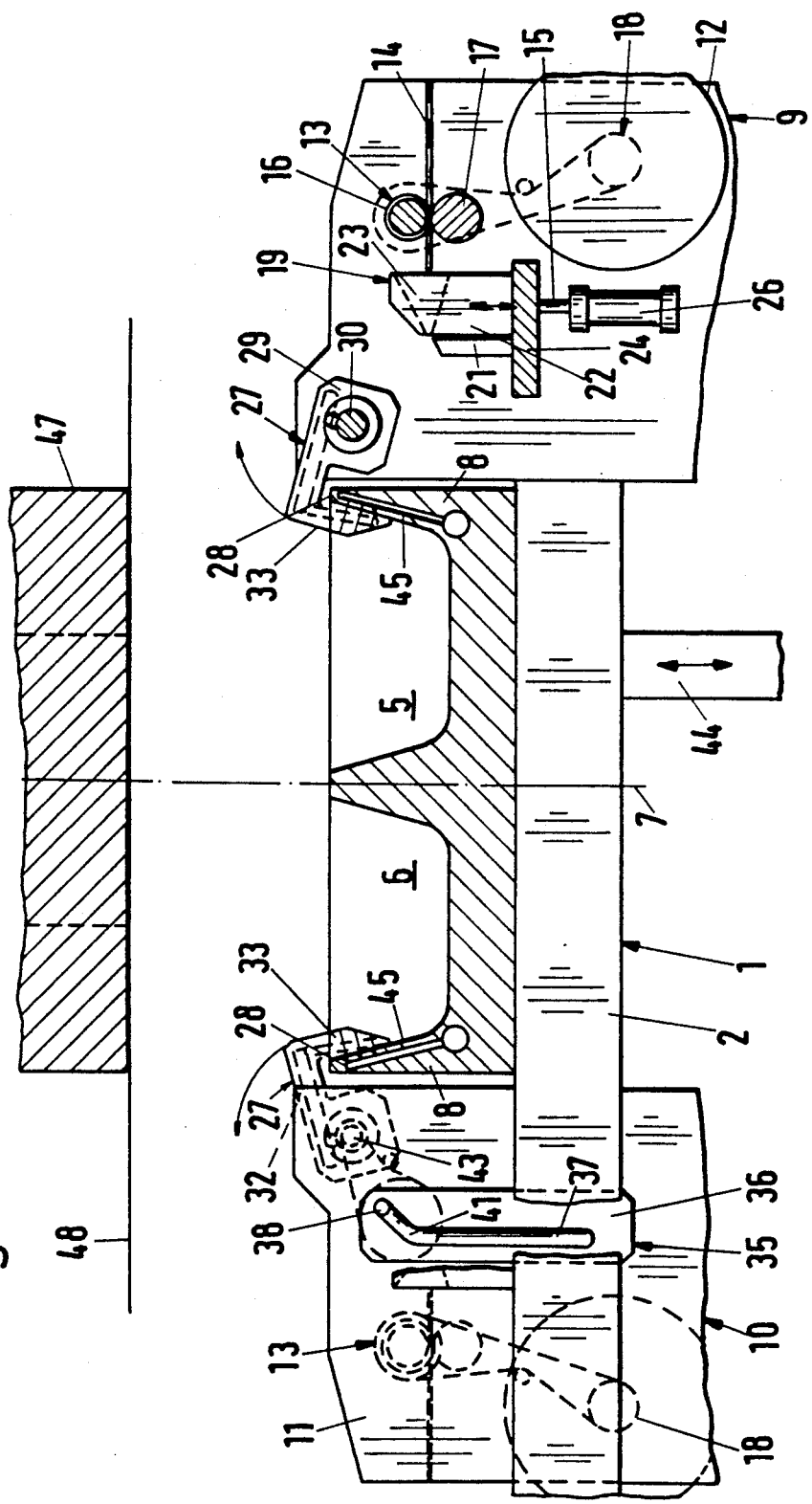
FIG. 2 is a section along line A—A of FIG. 1 on a larger scale than in the latter.
Figure 3:
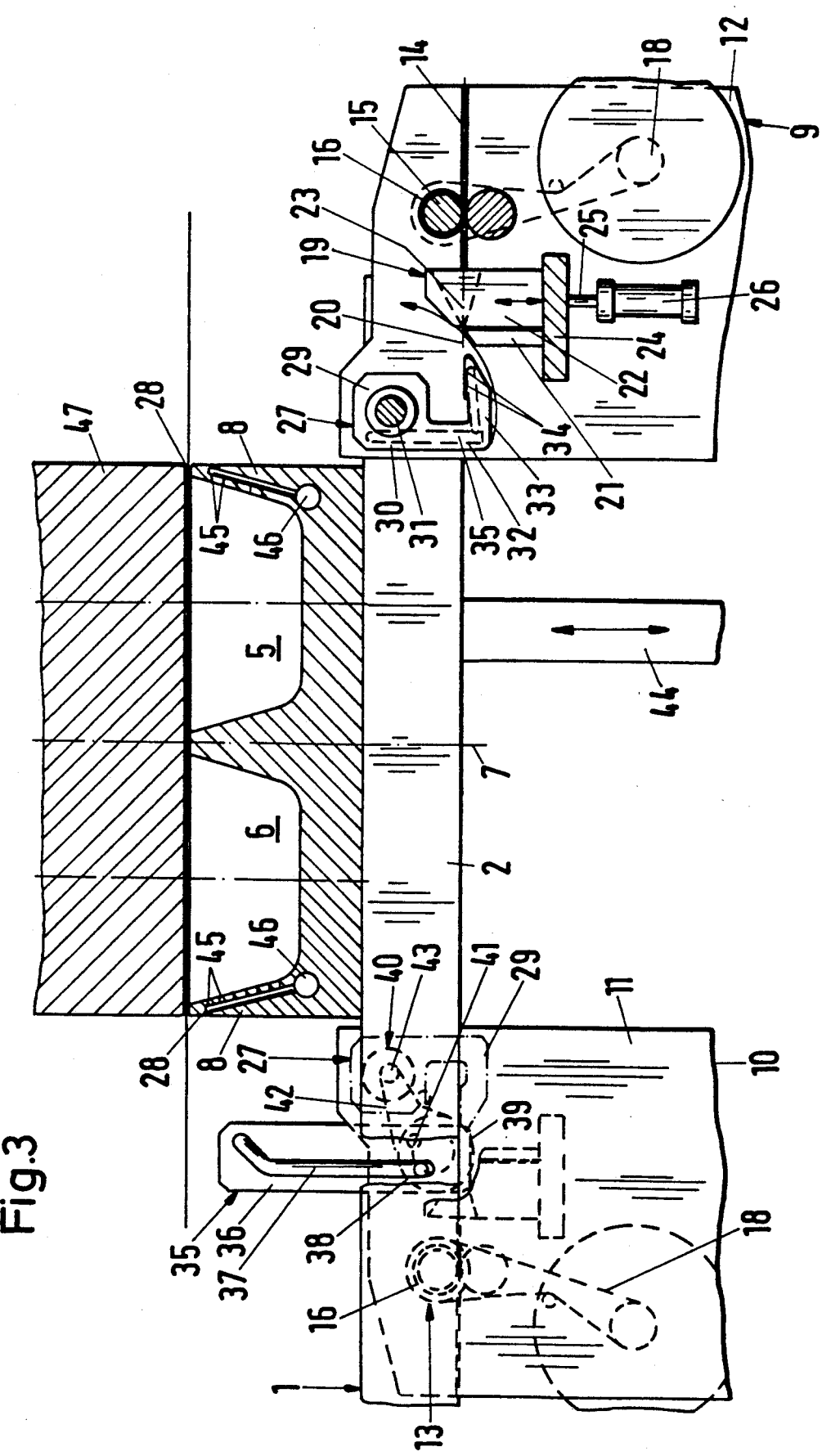
FIG. 3 is a cross-sectional representation corresponding to FIG. 2, but with the label transfer means in a different working position.

In the cutting device 19 of each carriage 9, 10, a single label 20 (FIG. 3) is cut off from the leading end of the particular label strip 14. Each cutting device 19 includes a fixed knife 21 and a guide 22 serving as a counter-knife and moved by means of a drive with respect to the knife 21 for each cut. The knife 21 and the guide 22 are supported all along the length of each of the carriages 9 and 10 for all of the label strips 14. At the same time the guide 22, as it can be seen especially in FIGS. 2 and 3, is guided in the plane of the movement of the label strip 14 in appropriate side guiding means, and is constituted by a slotted body with a guiding funnel 23 which terminates in an exit slot through which the leading end of the label strip 14 passes as it leaves the guide 22 facing the knife 21. At its bottom the guide 22 is supported on a plate 24 to the bottom of which is fastened the piston rod 25 of a jack 26 on the carriage 9 or 10; the jack is operated by an appropriate pressure means, preferably compressed air.

As soon as the label strips 14 have been advanced by the intermittently operating feeder 13 by an amount determining the label length, under the control of a suitable photoelectric cell control for example, the cutting device 19 is actuated to sever the leading end of the label strip, which meantime has been gripped by a transfer arm 27 of the label feed apparatus supported on the carriage 9 or 10. Not until the front end of the label strip 14 has been held in this manner is the severing of the label 20 performed by a downward movement of the guide 22 by the retraction of the piston rod 25 of the jack 26, while the exit slot area of the guide 22 acts as a counter-knife to the fixed knife 21 in the performance of the severing action.

The transfer arm 27 of each carriage 9, 10, constitutes a transport means by which the label 20 severed from the leading end of the label strip 14 is brought over the upper edge 28 of the mold cavity 5 or 6 into contact with the inside surface of the adjacent side wall 8 of the mold cavity 5 or 6.

In accordance with the two-row mold cavity arrangement chosen in the example represented, with four mold cavities 5 and 6, respectively, in each row, four transfer arms 27 each in the form of a rocker arm 29 are provided, the rocker arms being affixed to a common rocker shaft 30 in alignment with the cutting device 19. The rocker shaft 30 is journaled in the two end plates 11 and 12 of the carriage 9, 10, and defines a horizontal axis 31 parallel to the edge 28 of the mold cavities 5 and 6, about which the rocker arms 29 can rock clockwise and counterclockwise between their receiving position shown in FIG. 3 and their transfer position seen in FIG. 2.

The rocker arms 29 are L-shaped, one limb 32 of the L being the part of the rocker that is fastened to the shaft, while the limb 33, when the rocker arm 29 is in the receiving position seen in FIG. 3, forms on its top surface a horizontal surface for receiving the label 20 or the leading end of the label strip 14, which is directly behind the cutting device 19 in this position and lies in a common horizontal plane with the cutting plane of the label strip 14. At the same time, means for label holding are associated with the receiving surface offered by the limb 33, which in the case of the example represented, include vacuum orifices 34 in the receiving surface which are connected to a vacuum source through air passages 35 in the limbs 32 and 33 of each rocker arm 29.

For the rocking of the rocker shaft 30 with its rocker arms 29, a cam control 35 is associated with both of the carriages 9 and 10 bearing the label feed device. Each cam control 35 includes a guide plate 36 mounted on the inside of the crosspiece 2 of the bottom tool 1, and the guide plate 36 rises above the crosspiece 2 and has an upright cam slot 37 which is vertical over most of its length and only in its top end area is it bent toward the adjacent row of mold cavities 5 and 6 at an angle of about 45 degrees in the example represented. A crankpin 38 is engaged at one end in the cam slot 37 and its other end is fastened in the adjacent face of a drive wheel 39 of a rocker shaft drive 40, off-center from the axis of rotation 31 of the drive wheel 39. The drive wheel 39 is journaled in the adjacent end plate 11 of the corresponding carriage 9 or 10 and is drivingly connected by a chain 42 or other such transmission means to another drive wheel 43 which is fastened on the adjacent end of the rocker shaft 30 which is brought out through the end plate 11.

To perform the transfer of labels to the mold cavities 5 and 6, when the rocker arms 29 are in the receiving position shown in FIG. 3, a vacuum is produced at the upper receiving surfaces of the limbs 33, after the forward end of the label strip 14 has been advanced onto it in the manner described above, and the label strip is held by vacuum on the limb 33 of the rocker 29. Then the severance of the label 20 from the label strip by a cutting device 19 takes place in the manner described above.

By the downward movement of the bottom tool 1, which now takes place within the cycle of operation of the thermoforming machine, and which is performed through a connecting rod 44 by means of a jack not shown, the drive wheel 39 of the rocker shaft drive 40 is turned by the entry of the crank pin 38 into the upper, slanted portion of the cam track 37 of the cam control 35 to the adjacent row of the mold cavities 5 and 6, and with the appropriately selected ratio of the rocker shaft drive 40, the rocker shaft 31 rotates accordingly to such an extent that it is rocked with its rocker arms 29 into the adjacent mold cavities 5 and 6 of the bottom tool 1 which has reached its lower, starting position, in order to bring the labels 20 held on the limbs 33 into contact with the inner surface of the adjacent side wall 8 of the mold cavities 5 and 6, such that only a slight air gap remains between the label 20 and the adjacent mold cavity side wall 8.

In the side walls 8 of the mold cavities 5, 6, that receive the labels 20, vacuum orifices are also found as means for holding labels; they are identified at 45 and are connected by air passages 46 to a vacuum source. The vacuum orifices 45, like the vacuum orifices 34 of the rocker arms 29, are actuated by an appropriate controller in the working cycle of the thermoforming machine such that they are selectively connected to their vacuum source or vented. In the case of the labels 20 applied to the inner surface of the mold cavity side walls 8, the fixing of the labels is taken over immediately after they are in place by connecting the vacuum orifices 45 to their vacuum source while at the same time venting the vacuum in the limbs 33 of the rocker arms 29. FIG. 2 shows the rocker arms 29 in their transfer position within the mold cavities 5 and 6 in which the labels 20 are taken by the side walls 8 of the mold cavity.

After the labels 20 have been received by the mold cavity side walls 8, the bottom tool 1 moves upward in the working cycle of the thermoforming machine against the fixedly held carriages 9 and 10, and by a reverse operation of the cam controls 35 of the rocker shaft drives 40, the rocker arms 29 are rocked back out of the mold cavities 5, 6, by a corresponding reversal of their rocker shafts 30, to again assume their receiving position seen in FIG. 3. The rocking angle of the rocker arms 29 between their receiving position and their transfer position in a vertical plane transversely of the bottom tool 1 ranges between 180 and 270 degrees, and amounts in the example shown to about 225°.

After the rocker arms 29 are rocked out of the mold cavities 5 and 6, the thermoforming process is performed by the bottom tool 1 rising upwardly against a top tool diagrammatically represented at 47, and shaping the heated film 48, which can be accomplished by a preliminary punch system and by air, in which the labels 20 are pressed against the corresponding side walls 8 of the mold cavities 5, 6, and thus sealed or cemented to the shaped plastic container. Then the vacuum in the vacuum orifices 45 of the mold cavities 5, 6, can be broken to enable the plastic containers to be stripped from the molds, and another working cycle can begin, in which the timing of the individual working steps can be controlled so that the rocker arms 29 turned back to their receiving position can take a fresh label 20 from their label strip 14 during the thermoforming process and fix it accurately in position in the manner described.

What is claim is:

1. Molding apparatus including means for for feeding a label to a mold cavity having an upper edge and a side wall extending downwardly from said upper edge, said mold cavity being disposed on a moveable part of a molding apparatus which is operable to thermoform plastic containers in said mold cavity, comprising a support means juxtaposed to said moveable part of said molding apparatus, means for feeding and severing mounted on said support means and operable to cut and successively feed labels, a transfer means mounted on said support means for movement between a label-receiving position and a label-applying position, said means for feeding and severing feeding said labels to said transfer means when said transfer means is in said label-receiving position, said transfer means when in said label-applying position being juxtaposed to an inside surface of said side wall of said mold cavity, and pivoted means operable to pivot said transfer means from said label-receiving position and over said top edge of said mold cavity into said mold cavity to said label-applying position juxtaposed to said inside surface of said side wall of said mold cavity to transfer said label to said inside surface.

2. Apparatus according to claim 1, wherein said moveable part of said molding apparatus is moveable between a labeling position and a thermoforming position, said support means being juxtaposed to said moveable part when said moveable part is in said labeling position.

3. Apparatus according to claim 2, wherein said labeling position underlies said thermoforming position, said molding apparatus having means for feeding a plastic film over said mold cavities, said plastic film being thermoformed into said containers while said moveable part is in said thermoforming position.

4. Apparatus according to claim 3, wherein said support means comprises carriage means moveable in a direction transversely to the direction of feed of said plastic film.

5. Apparatus according to claim 1, wherein said means for feeding and severing comprises roller means for feeding an elongated length of label material, and cutter means for cutting said label material into individual labels.

6. Apparatus according to claim 1, wherein said means for feeding and severing comprises a fixed knife and a guide body having a slot and an entry funnel leading to said slot such that said label passes through said entry funnel into said slot, said means for feeding and severing further comprising a drive means for moving said guide body relative to said fixed knife to effect cutting of said label on said fixed knife.

7. Apparatus according to claim 1, wherein said transfer means comprises a rocker arm shaft having an axis parallel to said upper edge of said mold cavity, and rocker arm means pivoted about said axis for pivotal movement between said label-receiving position and said label-applying position.

8. Apparatus according to claim 7, wherein said rocker arm means comprises a receiving surface receiving said labels from said feeding means, said receiving surface being horizontally disposed when said transfer means is in said label-receiving position.

9. Apparatus according to claim 7, wherein said rocker arm means is pivotable more than 180° between said label-receiving and label-applying positions.

10. Apparatus according to claim 8, wherein said rocker arm means comprises retaining means for returning said label on said receiving surface.

11. Apparatus according to claim 10, wherein said retaining means comprises vacuum orifice means on said receiving surface, said vacuum orifice means being connected to a source of vacuum.

12. Apparatus according to claim 11, wherein said vacuum orifice means has a vent.

13. Apparatus according to claim 7 further comprising actuating means on said side wall of said mold cavity operable to effect transfer of said labels from said rocker arm means to said inside surface of said mold cavity.

14. Apparatus according to claim 13, wherein said actuating means comprises vacuum orifice means in said side wall of said mold cavity opening up to said inside surface of said side wall, said vacuum orifice means being connected to a source of vacuum.

15. Apparatus according to claim 14, wherein said vacuum orifice means has a vent.

16. Apparatus according to claim 7, wherein said means operable to move said transfer means comprises a cam means and a drive means between said cam means and said rocker arm shaft, said cam means comprising a cam member having a slot and a rotary member having a pin disposed in said slot, said drive means being operably disposed between said rotary member and said rocker arm shaft, said rotary member being rotatably mounted on said structure means, said cam member being mounted on said moveable part of said molding apparatus.

17. Apparatus according to claim 7, wherein said mold cavity has a plurality of mold cavity sections, said transfer means comprising a plurality of rocker arm means pivoted about said axis, said plurality of rocker arm means being operable to effect transfer of labels to each of said mold cavity sections.

18. Apparatus according to claim 1, wherein said mold cavity has a plurality of mold cavity sections, said mold cavity having two generally parallel upper edges, said transfer means comprising a rocker arm shaft mounted on each side of said mold cavity and having axes parallel to said upper edges, said transfer means comprising a plurality of rocker arms pivoted about the axes of said rocker arm shafts, said rocker arms being operable to effect transfer of labels over both top edges of said mold cavity to said plurality of mold cavity sections.

19. Apparatus according to claim 1, wherein said mold cavity has two parallel rows of mold cavity sections disposed symmetrically about a vertical longitudinal central plane, each of said mold cavity sections having its own associated feed means and transfer means to thereby provide for applying a label to each of said mold cavity sections on each side of said central plane.

20. Apparatus according to claim 7, wherein said support means comprises a moveably mounted carriage moveable in a transverse direction generally perpendicular to said axis of said rocker arm shaft.

* * * * *